United States Patent Office 3,093,807
Patented June 11, 1963

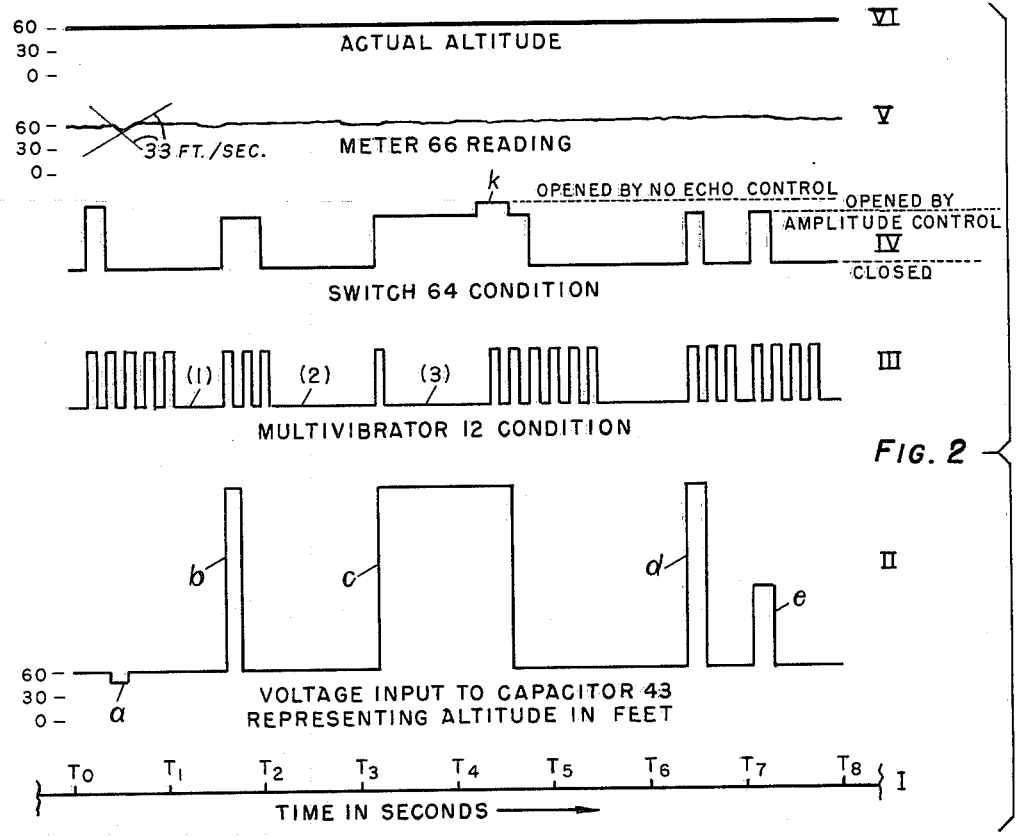
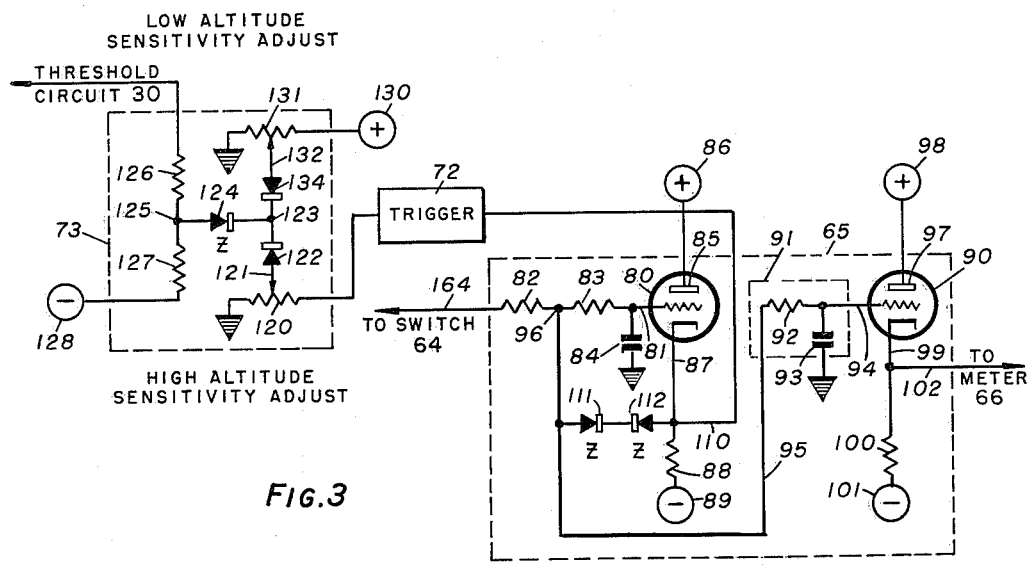

3,093,807
SONIC ALTIMETER
Lawrence S. Crane, Los Angeles, and Irvin M. Starr, San Fernando, Calif., assignors to The Bendix Corporation, a corporation of Delaware
Filed Apr. 11, 1960, Ser. No. 21,335
15 Claims. (Cl. 340—1)

This invention relates to echo ranging systems, and more particularly to aircraft altimeters employing radiated energy in the sonic frequency range.

In the copending patent applications of James A. Wippert, Serial No. 554,203, now U.S. Patent No. 3,038,142 and Serial No. 711,514, filed December 20, 1955, and January 27, 1958, respectively, systems employing sonic wave energy for the determination of aircraft altitude, in particular in the low altitude range of 0 to 300 feet, are disclosed. The use of sonic waves in such a device, as opposed to radio waves in radar type altimeters, has the particular advantage of a propagation rate through air slow enough, in the order of 1080 feet per second, to afford a sufficient delay in time for accurate measurement of the pulse-echo interval. It is possible, employing the systems of the two above-identified Wippert applications, to indicate the altitude of the aircraft in the range of 0 to 300 feet with an accuracy of +0.5 feet at low altitudes in the order of 10 feet or less and ±15 feet at an altitude in the order of 300 feet. This degree of accuracy is essential for the successful operation under poor visibility conditions of aircraft, such as helicopters required to hover for extended periods of time at a designated altitude. Extreme accuracy is also required when the aircraft is intended to be under the control of an autopilot.

As is recognized, any system employing sonic waves for echo ranging is subject to interference from numerous man-made sources of sonic energy. In the systems described in the Wippert applications, the sonic frequency employed is 3000 c.p.s. for the pulsed energy directed toward the ground. It is recognized that one source of sonic energy which is a potential cause of interference is the aircraft engine or engines generating a broad spectrum of sonic energy. When the aircraft is operating in proximity to the ground at the altitude for which the sonic altimeter is designed, not only is there cause for interference from the aircraft engines due to normal operation, but the sound waves traveling from the engine noise source are reflected by the terrain and reach the altimeter echo receiver in the same manner as the desired signal. Therefore, discrimination against the noise source on the basis of directly of the receiving apparatus is of little utility. Similarly, discrimination against a noise source on a frequency basis is limited because the engines produce the broad spectrum including substantial components at 3000 c.p.s.

As described in the Wippert applications, the sonic altimeter employs a visual indicator in the form of a meter with a needle moving to register the altitude above the ground as a function of the voltage stored on a capacitor. A threshold adjustment is included for setting the sensitivity of the altimeter receiver slightly above the ambient noise level during normal operation of the aircraft. Despite this precaution, on occasion the noise from the engines, directly or as reflected from the ground, provides a false indication. Such noise pulses passing through the altimeter may cause violent and erratic movement of the indicator needle. When the altimeter is designed for observation by the pilot, it is possible for him to recognize that such periodic needle movements are the result of noise and should be disregarded. However, when the altimeter reading constitutes an input to the autopilot, the device would tend to compensate for the apparent altitude change resulting in attempted violent aircraft correcting movements.

With these thoughts in mind, it is the general object of this invention to improve the rejection of noise in echo ranging systems.

A more specific object of this invention is to achieve discrimination against false signals entering such systems from either aircraft noise or other sources of interference.

Another object of this invention is to limit the rate of change of the altitude reading as a function of the maximum climb and descent rate of the aircraft.

Still another object of this invention is to provide variable sensitivity for the echo detection means as a function of the altitude of the aircraft.

Briefly, in accordance with this invention the altimeter includes means for sensing the magnitude of incremental voltage changes indicating altitude changes at the input to the storage capacitor and a switch for temporarily disabling the indicator or other utilization device for incremental voltage changes greater than a selected standard. Such changes indicate an apparent increase or decrease in altitude of an amount greater than the expected normal change in altitude of the aircraft during a pulse period of the altimeter. The apparatus also includes a linear charge rate circuit, the rate of which is correlated to the maximum normal rate of ascent or descent of the aircraft. The linear charge rate circuit operates to allow the indicator to assume a new reading at a linear rate of change when the incremental voltage change on the storage capacitor exceeds a predetermined threshold, for example the voltage at which a Zener diode breaks down, but does not exceed the voltage at which the disabling switch will open. The apparatus also includes a diode network which responds to the voltage on the storage capacitor for adjusting the sensitivity of the receiver at high altitudes.

One feature of the invention is a sonic altimeter including means for sensing the magnitude of incremental altitude changes and for temporarily disabling the indicating device when the magnitude of the changes is so great as to indicate a false signal.

Another feature is a sonic altimeter including means for limiting the rate of movement of the indicator upon reception of valid but large altitude changes as a function of the maximum normal ascent and descent rate of the aircraft in which it operates.

Another feature is a sonic altimeter incorporating means responsive to the actual altitude reading for changing the pulse receiver sensitivity, such as to increase its sensitivity above a predetermined altitude.

A clear understanding of this invention may be had from the following detailed description with reference to the drawings, in which:

FIG. 2 is a graphical representation of certain of the operational characteristics of the invention.

FIG. 3 is an electrical schematic of novel component circuits employed in the invention.

Altimeter General Description

Figure 1:
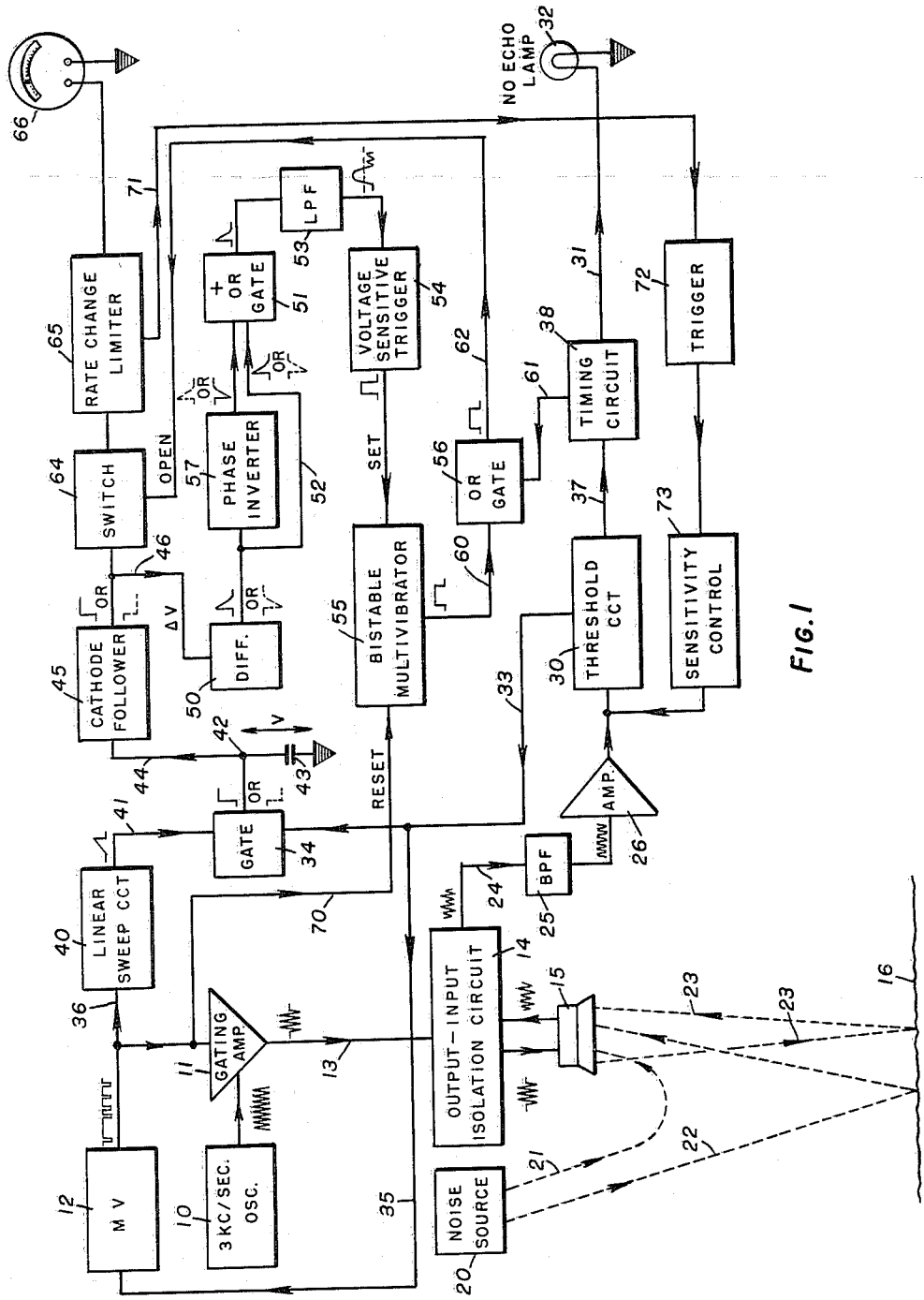
FIG. 1 is a block diagram of an altimeter incorporating the invention.

Referring now to FIG. 1, the sonic altimeter therein disclosed is of the general type disclosed in Wippert application Serial No. 711,514 mentioned above. For purposes of clairity, certain of the novel features of the Wippert altimeter have been omitted, since they bear no direct relation to this invention.

The functions of the altimeter that are similar to those of other echo ranging systems are: to generate a wave of known frequency; to transmit pulses of the waves in the direction of the object to be ranged; and to detect the return echo pulses. The velocity of transmission of the wave through the medium being a known factor, the delay between the time of transmission of the pulse and its reception therefore is a function of the range to the object. In the system of FIG. 1, the output of a 3-kilocycles-per-second oscillator 10 is introduced into a gating amplifier 11 under the control of an astable multivibrator 12. The multivibrator 12 has a normal operating cycle of one second in one condition and 100 milliseconds in the second condition, so that it opens a gating amplifier 11 once each second (unless otherwise triggered), and oscillations of three kilocycles per second are passed through lead 13 from the gating amplifier 11 to an output-input isolation circuit 14 and thence to a transducer 15. The output-input isolation circuit 14 may be simply a transmit-receive switch as is well known in the art, or may employ the amplitude discriminator disclosed in Wippert application Serial No. 711,514. The purpose of the circuit 14 is to allow the application of pulses to the transducer 15 for conversion from an electrical to an acoustic wave while isolating the sensitive receiver from the bursts of transmitted energy.

The transducer 15 is directed toward the object of which the range is desired. In the usual application of this device the object 16 constitutes the ground, and the transducer 15 is mounted on an aircraft and directed toward the ground.

In this environment, the system is subject to several sources of interference. The most significant sources are the engine and rotor blades of the aircraft itself, shown for this purpose simply as a noise source 20. It is noted that the noise source 20 in close proximity to the transducer 15 allows directly radiated energy in the sonic frequency range to reach the transducer 15 as indicated by the dashed line 21, and additionally when the aircraft is operating at low altitudes, energy from the noise source 20 traverses the path 22 to the ground 16 and is reflected to the transducer 15 in the same manner as valid signals traversing the path 23. The sonic energy received by the transducer 15 and isolated from the incoming pulses on lead 13 is passed over lead 24 to a band pass filter 25 centered on 3000 cycles per second to an amplifier 26. The amplifier 26 may be automatically gain-controlled as described in the Wippert application, or simply may apply the amplified 3000 cycles per second received signal at an increased level to a threshold circuit 30.

The threshold circuit 30 compares the level of the signal from amplifier 26 with a fixed standard, for example, employing a thyratron which is triggered by voltages above a preselected level. The threshold circuit has an output lead 37 connected as the start signal input to a timing circuit 38. The circuit 38 may include a simple resistance-capacitance network controlling a relay so as to produce a voltage on an output lead 31 after a predetermined time interval, for example, 1.2 second. The voltage produced in the timing circuit 38 after the absence of a signal at the threshold circuit 30 for said predetermined time interval is applied via lead 31 to energize a no-echo lamp 32, thereby indicating that no echo or noise was detected. The lamp 32 is particularly useful when the altimeter is operating near the upper limit of its useful range. The timing circuit 38 also provides one input over lead 61 to an OR gate 56 hereinafter described. The threshold circuit 30 is also connected through a lead 33 to a gate 34, to open it in the event of the reception by the threshold circuit of a signal above the preselected threshold level. The output on lead 33 is also applied through lead 35, branching from lead 33 to trigger the multivibrator 12 in advance of its normal self-triggering period of approximately one second. Therefore, upon the reception of a return echo of sufficient magnitude for operation of the device, the next pulse is automatically transmitted in response thereto.

The multivibrator 12, in addition to controlling the gating amplifier 11 to transmit pulses, is connected by a lead 36 to a linear sweep circuit 40 to generate a sweep voltage varying linearly with time. This linear sweep voltage is a measure of the time lapse following transmission of a pulse, and when the gate 34 is momentarily opened by the return signal applied through lead 33, the sweep voltage is applied to a storage capacitor 43, raising or lowering the voltage thereon to the sweep voltage at that instant. The voltage across capacitor 43 therefore will vary in a stepwise manner, the magnitude of each step corresponding to the change in the echo return time which is a function of the change in altitude between successive pulses.

In accordance with the teaching of Wippert application Serial No. 711,514, the terminal 42 of capacitor 43 is connected to a voltage-sensitive meter which is calibrated directly in feet of altitude.

When so connected, a meter will give accurate altitude readings the greatest part of the time, but is subject to erroneous readings due to the reception of noise pulses which cause triggering of threshold circuit 30 and therefore allow the gate 34 to be opened at times not controlled by the actual altitude. The meter, therefore, momentarily registers a reading having no relationship to the correct altitude. This effect is clearly illustrated in FIG. 2, curve II. Curve II is a graphical representation of the voltage across capacitor 43 with the aircraft carrying the altimeter at a constant altitude of 60 feet. It is noted that for approximately 75% of the total time, which in this case is 8 seconds, the meter registers the correct altitude of 60 feet. However, numerous major positive excursions "b" "c," "d" and "e" appear in the trace, initiated by noise triggering of the threshold detector 30 in periods following the nonreception of valid echoes. In one instance, a small negative excursion "a" occurs, caused by noise triggering in a period preceding the reception of a valid echo.

In accordance with the invention, the effect of these false signals is virtually eliminated. The voltage on capacitor 43 in FIG. 1 is applied through a lead 44 to a cathode follower 45. The cathode follower 45 output constitutes a positive or negative step voltage, depending upon the direction of any change in the voltage V across the capacitor 43. A positive voltage step appears whenever the voltage on capacitor 43 is increased, thereby indicating an increase in altitude. Conversely, a negative step at the output of cathode follower 45 indicates a decrease in the voltage across capacitor 43 and a decrease in altitude. When the gate 34 opens (assumes conducting condition) and the voltage applied to the capacitor 43 by the gate is equal in magnitude to the voltage V already across the capacitor 43, indicating no change in altitude, no voltage change appears at the output of cathode follower 45. Both positive and negative voltage changes from cathode follower 45 are conducted via lead 46 to a differentiator 50 which produces a positive spike in the event of a positive step from cathode follower 45 or a negative spike where the voltage change at gate 34 produced a negative step. These differentiated pulses are applied to an OR gate 51 through lead 52 or through a phase inverter 57. The OR gate 51 passes positive pulses but does not pass negative pulses. The purpose of this dual connection is to provide a positive-going spike at one or the other inputs to the OR gate 51, regardless of the direction of the change in output voltage of cathode follower 45. The positive voltage spike derived from OR gate 51 to a low pass filter 53 designed to eliminate switching transients of the OR gate 51 and to allow the altimeter to respond accurately to rapid actual altitude changes, as will hereinafter be explained in connection with the operation of multivibrator 55. The output of low-pass filter 53 is applied to a voltage-sensitive trigger circuit 54, which may be a Schmitt trigger circuit of the type disclosed on pages 164–172 in Millman & Taub's "Pulse and Digital Circuits," published by McGraw-Hill Book Co. Inc., copyright 1956. The voltage-sensitive trigger 54 operates to produce a pulse whenever the input from the low-pass filter 53 exceeds a definite level. The output of the trigger 54 constitutes the "set" input to a bistable multivibrator 55. The multivibrator 55 output constitutes one of two inputs to an OR gate 56 over lead 60, the other input of which is a lead 61 from the timing circuit 38. The output of the OR gate 56 is connected through a lead 62 as the "open" control voltage of a switch 64, which is connected between the output of the cathode follower 45 and a rate change limiter 65, hereinafter described. The output of the limiter 65 is applied to the indicator or meter 66 of the apparatus.

With this arrangement, in addition to the basic elements of a ranging system receiver of (1) an echo detector, (2) means for generating a voltage of amplitude proportional to the delay of the echo, and (3) means for indicating the amplitude of the voltage in terms of altitude, the altimeter includes a control circuit which detects the difference between successive altitude readings as indicated by the magnitude of the voltage step produced by the succeeding, received echo and compares it to a fixed reference voltage (the firing voltage of trigger 54), which reference voltage is a function of the maximum altitude change between successive pulses for normal operation of the aircraft. When the voltage step exceeds the reference voltage, the trigger 54 fires switching multivibrator 55 which opens or interrupts conduction through switch 64 to hold the meter 66 at its previous reading. Similarly, the meter is held at the same reading upon the opening of switch 64 under the control of OR gate 56 if the threshold circuit 30 detects no recognizable return echo after 1.2 seconds. The threshold circuit 30 functions merely to produce an output pulse on both leads 33 and 37 whenever incoming signals from amplifier 26 exceed a predetermined level. The timing circuit 38, which may include a simple sawtooth generator and a relay along with appropriate power supplies, will operate the relay to apply current over lead 31 to the no-echo lamp 32 after the sawtooth voltage generated reached a level sufficient to close the relay. The period of charge for the sawtooth wave typically is 1.2 seconds. Signals arriving from the threshold circuit 30 over lead 37 stop the timing cycle and allow it to restart. Therefore, the no-echo lamp 32 under control of timing circuit 38 will be lighted any time that there has been an interval of at least 1.2 seconds from the last detected echo. The no-echo lamp 32 is then illuminated by timing circuit 38. An observation of the two indicators of this device, the meter 66 and the no-echo lamp 32, at that time would show that no echo was received from a pulse transmitted within the last 1.2 second of time, and that the previous registered altitude was as indicated on the meter 66.

The switch 64 is held in the open condition by the multivibrator 55, which remains in its "set" condition until it is reset over lead 70 by a pulse from the multivibrator 12 during the succeeding cycle.

The low pass filter 54 restricts the operation of the multivibrator 55 in a manner which improves the response to sustained rapid vertical aircraft movements. Such movement causes two or more spikes of potential, each large enough in magnitude to trigger the voltage-sensitive trigger 54, to appear in rapid sequence at the input to filter 53. The action of the filter 53 in such a situation causes a merger of separate spikes into a longer waveform, the initial rise of which triggers the voltage-sensitive triggger 54 and holds it in its fired condition. The trigger 54, which switches the condition of multivibrator 55, prevents its resetting during the period that the switching or set input from trigger 54 remains. Therefore only the first of a train of rapid voltage spikes will open the switch 64.

Between the switch 64 and the meter 66 is the rate change limiter 65 to be described in more detail in connection with FIG. 3. However, for clarity in understanding the elements of the invention described above, it should be noted that the rate change limiter 65 allows the passage of positive or negative voltage steps from the cathode follower 45 to the meter 66 in substantially undistorted form, whenever switch 64 is in its closed condition, provided the step denotes a rate of change in altitude less than the maximum rate of change of the aircraft; e.g., 2000 feet per minute, in the assumed case. Any incremental increase or decrease in altitude of low enough absolute value to avoid the opening of switch 64, but in excess of said maximum rate change, will be depicted upon the meter 66. However, the rate of change of the meter setting from the previous setting is limited to the 2000-feet-per-minute rate. For all normal movements of the aircraft over terrain of reasonable continuity, the meter will respond almost instantaneously to altitude changes. This feature of the invention incorporates into the otherwise near-instantaneous response of the meter a reduced rate of meter change which is a function of the maximum rate of ascent and descent of the aircraft on which the altimeter is installed.

The altimeter includes additionally an output from the rate change limiter 65 over lead 71 through a trigger 72 to a sensitivity control 73 which functions to change the sensitivity of the altimeter receiver as a function of the altitude reading to provide automatic sensitivity adjustment. This feature allows a greater sensitivity of the pulse receiver when at higher altitudes where the signal is subject to greater attenuation than at lower altitudes, and proportionally less noise is present. In the absence of this sensitivity control, the switch 64 would be opened by no-echo input signals on lead 61 a disproportionate amount of the time, because the received signal does not reach the threshold of circuit 30. With the addition of the sensitivity control circuit 73, the threshold 30 is lower at high altitudes, and signals which are received at a lower signal-to-noise ratio are still utilized to make altitude correction in the meter 66.

Referring now to FIG. 3, wherein the rate change limiter 65 and the sensistivity control circuit 73 may be seen in detail, the rate change limiter 65, which is connected between the switch 64 and the meter 66 of FIG. 1, includes a pair of cathode followers or unity gain amplifiers employing triodes 80 and 90. The grid 81 of the triode 80 is connected through a pair of series resistors 82 and 83 to the switch 64. The resistor 83 is substantially larger in size than resistor 82, having, for example, 2 megohms resistance as compared with 0.2 megohm. Associated with resistor 83 is a capacitor 84 forming a resistance-capacitance filter of comparatively long time constant at the input to the triode 80. The capacitor 84 may be in the order of 0.25 microfarad, thereby providing a time constant of 0.5 second with the resistor 83. The plate 85 of triode 80 is connected directly to a positive voltage supply 86, while the cathode 87 is connected through a resistor 88 to a negative voltage supply 89. The triode 90 has a similar resistance-capacitance filter 91 made up of resistor 92 and capacitor 93 at the input to its grid 94. The filter 91 is connected through lead 95 to the junction 96 of the resistors 82 and 83. Similar to the triode 85, the plate 97 of triode 90 is connected directly to a positive voltage supply 98 while the cathode 99 of the same tube is connected through a cathode resistor 100 to a negative voltage supply 101. The output from the triode 90 is taken at the cathode 99 via conductor 102 directly to the meter 66. The cathode follower output from the tube 80 is taken from the cathode 87 via lead 110 through trigger circuit 72 to the sensitivity control 73.

As described above, the two cathode followers 80 and 90 constitute two semi-independent loads on the output of the switch 64. The cathode follower 80 provides an input to the sensitivity control 73, and the cathode follower 90 forms the input to the meter 66. The relationship of the cathode followers 80 and 90 is changed from independent to dependent under certain operating conditions, owing to the presence of a pair of Zener diodes 111 and 112 connected in series-opposing relationship between the cathode 87 of triode 80 and the point 96. The Zener diodes, having the characteristic of a constant voltage drop thereacross when in the conducting condition and extremely high impedance when in a nonconducting condition, serve to isolate the cathode followers 80 and 90 in the presence of small changes of level from the switch 64 and allow the interaction of the two stages in the presence of high-level voltage steps from the switch 64 which indicate the presence of a rapid altitude change, although not sufficient in absolute magnitude to cause an opening of the switch 64. Low-level voltage steps received by the cathode follower 45 of FIG. 1 and transmitted through the normally closed switch 64 pass through resistor 82, conductor 95, and the RC filter 91 to the cathode follower 90, and are displayed directly upon the meter 66 through the lead 102. The RC filter 91 has a short time constant in the order of 0.15 second so as to allow almost instantaneous registration of low-level signals indicating small altitude rate changes on the meter.

In the presence of the high-level voltage step from switch 64 over lead 104, the Zener diodes 111 and 112 conduct and, as indicated above, have a constant voltage drop thereacross. By the very nature of the cathode follower, the voltage of the cathode 87 follows that of the grid 81, and there is a substantially constant voltage drop between grid 81 and cathode 87. There also is a constant voltage drop between the cathode 87 and the point 96 through the Zener diodes 111 and 112. A constant voltage drop therefore also appears across the resistor 83. A constant voltage drop across the resistor 83 produces a constant current therethrough, and owing to the fact that the grid 81 draws only insignificant current, the constant current through resistor 83 flows into the capacitor at a constant rate, producing a linear voltage rise on the capacitor 84. This linear charge rate is reflected in the change of voltage of the point 96 and limits the change in voltage of that point to the linear rate as determined by the grid-cathode voltage drop of tube 80, the Zener voltage of diodes 111 and 112 and the values of resistor 83 and capacitor 84. The linear charge characteristic of this combination is determined as a function of the maximum allowable rate of meter 66 change permitted. In this particular embodiment, the change correlated in terms of altitude as represented by the voltage change of point 96, is 2000 feet per minute or 33⅓ feet per second. The change of voltage of point 96 appears at the grid 94 of the tube 90 as modified by RC filter 91. The meter 66 connected to the cathode 99 of tube 90 follows the grid 94 voltage at the linear charge rate determined by the circuit of tube 80 independent of the magnitude of the voltage applied by switch 64.

The voltage of cathode 87 is applied over lead 110 and through trigger 72 to the sensitivity control 73. The voltage of cathode 87, if above the firing voltage of trigger 72, causes the trigger 72 to apply a voltage (e.g., 27 v.), to one side of a potentiometer 120, the opposite side of which is connected to ground. The wiper 121 of the potentiometer 120 is connected through an isolating diode 122 to a junction 123 at the cathode of a 30 volt Zener diode 124. A second current supply path to junction 123 is formed by the positive 30-volt supply 130, potentiometer 131 connected to ground, its wiper arm 132, and a second isolating diode 134. The anode of the Zener diode 124 is connected to a junction 125 between two series resistors 126 and 127 which are in the bias supply circuit from a 150-volt source 128 to the threshold circuit 30. The current from voltage supply 130 through the potentiometer 131, isolating diode 134, the Zener diode 124 to junction 125 is employed to establish the normal bias to the threshold circuit 30, for example to the control grid of a thyratron. This bias is adjustable by movement of the wiper 132 of potentiometer 131. The adjustment is employed to set the level at which the threshold circuit 30 of FIG. 1 will detect only relatively strong signals. Ordinarily, the adjustment of wiper 132 is made under normal operating conditions of the aircraft at low altitudes, e.g., below 100 feet.

At higher altitudes where the return echo is attenuated, the sensitivity of the receiver is preferably increased in order to increase the probability of detection of the return echo. This feature is especially useful for helicopters which will usually hover below 100 feet at which time they generate much more noise than in forward flight over 100 feet altitude primarily due to the difference in rotor pitch. This higher level sensitivity adjustment is accomplished by the adjustment of the wiper arm 121. Whenever the altitude registers above 100 feet as a function of the voltage of the cathode 87 of triode 80 in the rate change limiter circuit 65, the trigger 72 is fired, and the potentiometer 120 then constitutes a substitute source of current flowing through the resistor 127 to control the level of voltage of point 123 in the bias supply path for the threshold circuit 30. Therefore, whenever the aircraft is operating at above the 100-foot altitude, as indicated by the voltage of cathode 87 of stage 80, the control 121 is effective to increase the sensitivity of the threshold circuit 30.

The Zener diode 124 is employed in the common current path between terminals 123 and 125 in order to maintain the negative polarity of the point 125. This is necessary since voltages positive with respect to ground are provided by the supply 130 and by the trigger 72, although a negative bias is necessary for the threshold circuit 30. Of course, if a negative supply were substituted for supply 130 and the trigger 72 operated in the negative voltage region, the Zener diode 124 might be omitted.

Improvements in the Wippert inventions identified above may be clearly understood by reference to FIG. 2, which shows the effect of the amplitude control in eliminating the registration of false altitude readings due to noise pulses. FIG. 2 represents the operation of the device over a period of 8 seconds measured from time $T_0$ at the left side of FIG. 2 to $T_8$ at the right hand side. At all times the altimeter was located at an actual altitude of 60 feet. However, it was operating in the presence of an extremely high-level noise source which produced several erroneous voltage steps at the input to the capacitor 43 as shown on curve II of FIG. 2. Several of the excursions (those labeled $a$, $b$, $d$, and $e$) are of relatively short duration and would result in only a rapid movement of the meter needle from the correct position without the present invention. However, excursion ($c$) is of greater duration owing to (1) loss of a valid echo followed by (2) detection of a false echo followed by (3) the loss of all echoes for a period of over one second. The short duration movements $a$, $b$, $d$ and $e$ of the meter needle, although undesirable, could be tolerated in some applications. However, movements as indicated by the voltage change ($c$), whether the aircraft is under the control of the pilot or of an autopilot, are completely unacceptable.

At the time $T_0$, the curve II indicates a voltage on capacitor 43 equal to an altitude of 60 feet. At this time the multivibrator 12 is in one astable condition, as shown on curve III. After the elapse of 0.2 second, the multivibrator 12 switches condition, thereby gating the amplifier 11 to transmit a pulse. The multivibrator was not externally triggered by an echo, but operated at its own period, indicating the lack of reception of any echoes during the previous one-second period resulting in the opening of the switch 64 by the no-echo control, as may be seen from the first positive-going trace of the curve IV. During the period the switch 64 was opened by the no-echo control, the no-echo lamp 32 was illuminated. At $T_{0.4}$ second the threshold circuit 30 is triggered by a noise pulse (a) prior to the reception of the valid echo from the pulse transmitted at $T_{0.3}$ second. The result is small negative step (a) on curve II to approximately 40 feet, which is of insufficient amplitude to cause opening of the switch 64. The needle of meter 66 moves toward the indicated reading as shown in curve V but is restricted to 33 feet per second, as indicated in curve V by the negative slope tangential line.

At $T_{0.6}$ second, a valid echo is received, causing curve II to return to its normal level of 60 feet at the controlled rate indicated by the positive slope line of curve V. At $T_{1.2}$ seconds, there is a loss of echo, indicated on curve III by cessation of multivibrator switching during period (1). At $T_{1.6}$ seconds, threshold circuit 30 is triggered by a noise pulse at a time after the expected reception of a valid echo. This results in the large positive step (b), on curve II, and an opening of switch 64. At $T_{1.8}$ seconds a valid echo is received, resulting in the return of excursion (b) on curve II at that time which causes closing of switch 64. Throughout this sequence of events, almost no change in the meter reading was experienced, as illustrated by curve V.

At $T_{2.2}$ seconds there occurs loss of echo during period (2) of plot III, followed by a noise triggering of the threshold circuit 30 at $T_{3.2}$ seconds. A large positive step (c) is produced on curve II. Loss of echo occurs at $T_{3.4}$ seconds, causing a cessation of multivibrator switching during period (3) illustrated on curve III which in turn presents reclosure of switch 64. At $T_{4.2}$ seconds the no-echo lamp lights, while at $T_{4.4}$ seconds multivibrator 12 switches at its natural period. At $T_{4.6}$ seconds, a valid echo is received, extinguishing the no-echo lamp and causing a step return of curve II to its normal reading. The negative step voltage on capacitor 43 causes opening of switch 64 for one additional cycle until another valid echo is received at $T_{4.8}$ seconds, causing multivibrator 12 to switch and closing the switch 64.

In the same manner, the altimeter of this invention discriminates against noise interference in the remainder of the plot of FIG. 2, and the correct altitude reading of 60 appears almost unvaryingly on the meter 66. Normal operating conditions for the altimeter do not involve the high noise level illustrated in FIG. 2, so far greater accuracy is achieved in actual practice than those shown.

Although for the purpose of explaining the invention a particular embodiment thereof has been shown and described, obvious modifications will occur to a person skilled in the art, and we do not desire to be limited to the exact details shown and described.

We claim:

1. In a pulse-echo distance-measuring system: an oscillation generator; a transducer for radiating energy from the oscillation generator toward a distant object; means for introducing energy from the oscillation generator into the transducer; means for detecting echoes reflected by a distant object; means for developing successive voltages of magnitude a function of the elapsed period of time between the time of transmission and return of the echo; utilization means responsive to object distance as determined by the magnitude of the developed voltages; and means responsive to differences between successive developed voltages above a predetermined value for temporarily disabling the utilization means.

2. In a pulse-echo distance-measuring system: an oscillation generator; a transducer for radiating energy from the oscillation generator toward a distant object; means for introducing energy from the oscillation generator into the transducer; means for detecting echoes reflected by the distant object; means for developing successive voltages of magnitude a function of the elapsed period of time between the transmission and echo return; means for indicating the object distance as determined by the magnitude of the developed voltages; a normally closed switch connecting the indicating means to the voltage-developing means; means responsive to differences between successive developed voltages above a predetermined value for opening the normally closed switch; and means holding the indicator at the previous reading while the switch is opened.

3. In a pulse-echo distance-measuring system: an oscillation generator; a transducer for radiating energy from the oscillation generator toward a distant object; means for introducing pulses of energy from the oscillation generator into the transducer; means for detecting echoes of the pulses reflected by the distant object; means for developing successive voltages of magnitude a function of the elapsed period of time between the transmission and return of respective pulses; means for indicating the object distance as determined by the magnitude of the developed voltages; means for indicating the loss of an echo; means responsive to differences between successive developed voltages above a predetermined value; a switch connecting the indicating means to the voltage-developing means; said switch being under the control of the loss of echo-indicating means and the difference voltage-responsive means whereby the indicator is held to the previous reading upon the loss of echo or detection of an apparent altitude change above a predetermined value.

4. In a pulse-echo distance-measuring system: an oscillation generator; a transducer for radiating energy from the oscillation generator toward a distant object; means for introducing pulses of energy from the oscillation generator into the transducer; means for detecting echoes of the pulses reflected by the distant object; first means for developing successive voltages of magnitude a function of the elapsed period of time between the transmission and return of a pulse; second means for developing successive voltages of magnitude a function of the difference between successive voltages developed by the first means; an indicator for representing object distance as determined by the magnitude of the first developed voltages; a normally closed switch for connecting the indicator to the first voltage-developing means; said switch under the control of the second voltage-developing means whereby the indicator is held at the preceding reading when the output of the second voltage-developing means exceeds a predetermined level.

5. In a pulse-echo distance measuring system: an oscillation generator; a transducer for radiating energy from the oscillation generator toward a distance object; means for introducing pulses of energy from the oscillation generator into the transducer; means for detecting echoes of the pulses reflected by the distant object; means for developing successive voltages of magnitude a function of the elapsed period of time between the transmission and return of a pulse; means for indicating the object distance as determined by the magnitude of the developed voltages; indicator response-limiting means connecting the indicator to the voltage-developing means; said response-limiting means being responsive to successive developed voltages below a first preselected level for applying the voltages to the indicator and responsive to successive developed voltages above the preselected level for applying successive voltage changes to the indicator at a linear rate of change.

6. The combination in accordance with claim 5 wherein the system includes means responsive to successive voltage changes above a second predetermined level for temporarily preventing the application of voltage changes to the indicator.

7. In a pulse-echo distance-measuring system including means for developing successive voltages proportional to object distances and a voltage-responsive indicator for representing distance as a function of the voltage level applied thereto from the voltage-developing means, an indicator rate change limiter comprising a first electron discharge device including grid, plate and cathode electrodes, a second electron discharge device including grid, plate and cathode electrodes; means supplying a positive potential to the plate electrodes of the first and second electron discharge devices, a respective resistance-capacitance network connected to grid elements of each electron discharge device; the resistance-capacitance network of the second electron discharge device having a substantially shorter time constant than the resistance-capacitance network connected to the first electron discharge device; the first and second electron discharge devices connected through the respective networks to the voltage-developing means; the indicator connected to develop operating voltage from the second electron discharge device; and a nonlinear resistance element having essentially infinite impedance to applied voltages below a selected level and a substantially constant voltage drop when conducting connected between said resistance-capacitance networks and the cathode of the first electron discharge device whereby said first electron discharge device and its associated resistance-capacitance network are effectively isolated from the signal path by the high impedance of said constant voltage drop device in the presence of low-level signals and the indicator responds to voltage changes below the selected level for conduction of said nonlinear resistance element at a rate a function of the resistance-capacitance network associated with the second electron discharge device and said first electron discharge device and its associated resistance-capacitance network are effectively connected in the signal path through the low impedance of said constant voltage drop devices in the presenece of signals above the selected level and said indicator responds to voltage changes above the selected level at a rate a function of the resistance-capacitance network associated with the first electron discharge device.

8. A sonic altimeter comprising: means for generating a wave in the sonic frequency range; a transducer for transmitting sonic energy toward the ground; means for applying pulses of sonic energy from the generator to the transducer; means for detecting the echo of the sonic pulses reflected by the ground; first means developing a voltage from each detected echo the magnitude of which is a function of the time interval between the transmission of a sonic pulse and the detection of its echo; means for indicating altitude of the transducer as determined by the magnitude of the voltage developed by the first means; second means developing a voltage the magnitude of which is a function of the difference in time intervals at successive detected echoes; switch means normally applying the output of the first voltage-developing means to the indicating means; and means responsive to voltages developed by the second means above a predetermined level for temporarily opening the switch means.

9. A sonic altimeter comprising: means for generating a wave in the sonic frequency range; a transducer for transmitting sonic energy toward the ground; means for applying pulses of energy from the generator to the transducer; means for detecting the echo of the pulses reflected by the ground; first means developing a voltage for each detected echo the magnitude of which is a function of the time interval between the transmission of a sonic pulse and the detection of its echo; means for indicating altitude as determined by the magnitude of the voltage developed by the first means; second means developing a voltage the magnitude of which is a function of the difference in time intervals at successive detected echoes; rate control means for applying voltages developed by the first means below a first threshold level to the indicating means directly, and voltages above the first threshold at a controlled rate; and switch means responsive to voltages developed by the second means above a second threshold for temporarily disabling the voltage input to the indicating means.

10. The combination in accordance with claim 9 wherein the rate control means comprises a first resistance-capacitance filter between the first voltage developing means and the indicating means; a second resistance-capacitance network having a longer time constant than the first resistance-capacitance network; and voltage-responsive means for connecting the second resistance-capacitance network between the first voltage developing means and the indicating means in the presence of voltages developed by the second means above the first threshold.

11. The combination in accordance with claim 10 wherein the voltage-responsive means for connecting the second resistance-capacitance network between the first voltage-developing means and the indicating means comprises a Zener diode.

12. A linear rate limiter comprising a substantially unity gain amplifier, a pair of input conductors for the amplifier, a resistor including first and second terminals in series with one input conductor and a capacitor connected between the second terminal of the resistor and the opposite input conductor, a pair of output terminals for the amplifier, and a constant voltage drop device connecting one output terminal to the first terminal of the resistor.

13. A linear voltage rate limiter comprising a substantially unity gain amplifier; a pair of input conductors for the amplifier including a resistance element in series with one input conductor and a capacitor connected across the input conductors; an output circuit for the amplifier, and a Zener voltage element connecting one terminal of the output circuit to the input resistance element.

14. A voltage rate limiter for developing a linear varying voltage from positive or negative voltage steps comprising a substantially unity gain amplifier, an input circuit for the amplifier including a series resistance and a shunt capacitor, an output circuit for the amplifier, and a pair of series-connected, oppositely-poled Zener diodes connecting the output circuit to the input circuit of the amplifier.

15. A rate control circuit for passing voltage pulses below a predetermined level substantially undistorted and for producing a linear varying output from voltage pulses above the predetermined level comprising: a substantially unity gain amplifier; an input circuit including a series resistance element and a shunt capacitor; an output circuit for the amplifier; a Zener diode having a Zener voltage equal to the predetermined voltage level; means connecting the Zener diode between the output circuit of the amplifier and the series resistance element; and means deriving the output voltage from the junction of the series resistance and Zener diode.

References Cited in the file of this patent

UNITED STATES PATENTS

| | | |
|---|---|---|
| 2,108,090 | Turner | Feb. 15, 1938 |
| 2,144,843 | Hearn | Jan. 24, 1939 |
| 2,333,688 | Shepard | Nov. 9, 1943 |
| 2,418,538 | Yetter | Apr. 8, 1947 |
| 2,519,898 | Gardiner | Aug. 22, 1950 |

FOREIGN PATENTS

| | | |
|---|---|---|
| 817,296 | Great Britain | July 29, 1959 |